US008386238B2

(12) United States Patent  (10) Patent No.: US 8,386,238 B2
Spataro  (45) Date of Patent: Feb. 26, 2013

(54) SYSTEMS AND METHODS FOR EVALUATING A SEQUENCE OF CHARACTERS

(75) Inventor: Anthony Spataro, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 683 days.

(21) Appl. No.: 12/265,166

(22) Filed: Nov. 5, 2008

(65) Prior Publication Data

US 2010/0114560 A1    May 6, 2010

(51) Int. Cl.
 *G06F 17/20* (2006.01)
 *G06F 17/28* (2006.01)
 *G06F 17/27* (2006.01)
 *G06F 17/21* (2006.01)
 *G10L 15/06* (2006.01)
 *G10L 11/00* (2006.01)
 *G10L 21/06* (2006.01)
 *G10L 21/00* (2006.01)

(52) U.S. Cl. ............. 704/9; 704/1; 704/2; 704/3; 704/4; 704/5; 704/6; 704/7; 704/8; 704/10; 704/245; 704/270; 704/270.1; 704/273; 704/275

(58) Field of Classification Search ................. 704/1–10, 704/245, 270, 270.1, 275, 273; 713/183
See application file for complete search history.

(56) References Cited

U.S. PATENT DOCUMENTS

| | | | | |
|---|---|---|---|---|
| 5,125,022 A | * | 6/1992 | Hunt et al. | 379/88.02 |
| 5,303,299 A | * | 4/1994 | Hunt et al. | 379/88.01 |
| 5,394,471 A | | 2/1995 | Ganesan et al. | |
| 5,450,524 A | * | 9/1995 | Rissanen | 704/245 |
| 5,588,056 A | * | 12/1996 | Ganesan | 713/183 |
| 5,721,827 A | | 2/1998 | Logan et al. | |
| 5,732,216 A | | 3/1998 | Logan et al. | |
| 5,742,829 A | | 4/1998 | Davis et al. | |
| 5,850,448 A | * | 12/1998 | Ganesan | 713/184 |
| 6,473,794 B1 | | 10/2002 | Guheen et al. | |
| 6,519,571 B1 | | 2/2003 | Guheen et al. | |
| 6,536,037 B1 | | 3/2003 | Barrese et al. | |
| 6,598,075 B1 | | 7/2003 | Ogdon et al. | |
| 6,606,744 B1 | | 8/2003 | Mikurak | |
| 6,615,166 B1 | | 9/2003 | Guheen et al. | |
| 6,633,742 B1 | | 10/2003 | Turner et al. | |
| 6,671,818 B1 | | 12/2003 | Mikurak | |
| 6,721,713 B1 | | 4/2004 | Guheen et al. | |
| 6,725,425 B1 | | 4/2004 | Rajan et al. | |
| 6,757,365 B1 | | 6/2004 | Bogard | |
| 6,772,213 B2 | | 8/2004 | Glorikian | |

(Continued)

OTHER PUBLICATIONS

Yang, Yanjiang; Deng, Robert H.; Bao, Feng; "A Practical Password-Based Two-Server Authentication and Key Exchange System", IEEE Transactions on Dependable and Secure Computing, vol. 3, No. 2, Apr.-Jun. 2006, pp. 105-114.*

(Continued)

*Primary Examiner* — Edgar Guerra-Erazo

(74) *Attorney, Agent, or Firm* — McDermott Will & Emery LLP

(57) ABSTRACT

A sequence of characters may be evaluated to determine the presence of a natural language word. The sequence of characters may be analyzed to find a subsequence of alphabetical characters. Based on a statistical model of a natural language, a probability that the subsequence is a natural language word may be calculated. The probability may then be used to determine if the subsequence is indeed a natural language word.

25 Claims, 3 Drawing Sheets

U.S. PATENT DOCUMENTS

| | | | |
|---|---|---|---|
| 6,816,904 | B1 | 11/2004 | Ludwig et al. |
| 6,850,252 | B1 | 2/2005 | Hoffberg |
| 6,859,212 | B2 | 2/2005 | Kumar et al. |
| 6,895,084 | B1 | 5/2005 | Saylor et al. |
| 6,957,186 | B1 | 10/2005 | Guheen et al. |
| 6,968,364 | B1 | 11/2005 | Wong et al. |
| 6,971,014 | B1 * | 11/2005 | Hagmeier et al. ............ 713/182 |
| 6,980,962 | B1 | 12/2005 | Arganbright et al. |
| 6,988,126 | B2 | 1/2006 | Wilcock et al. |
| 6,996,605 | B2 | 2/2006 | Low et al. |
| 7,000,019 | B2 | 2/2006 | Low et al. |
| 7,013,290 | B2 | 3/2006 | Ananian |
| 7,023,979 | B1 | 4/2006 | Wu et al. |
| 7,027,975 | B1 | 4/2006 | Pazandak et al. |
| 7,036,128 | B1 | 4/2006 | Julia et al. |
| 7,043,716 | B2 | 5/2006 | Zimmer et al. |
| 7,124,101 | B1 | 10/2006 | Mikurak |
| 7,130,807 | B1 | 10/2006 | Mikurak |
| 7,143,089 | B2 | 11/2006 | Petras et al. |
| 7,149,698 | B2 | 12/2006 | Guheen et al. |
| 7,165,041 | B1 | 1/2007 | Guheen et al. |
| 7,200,804 | B1 | 4/2007 | Khavari et al. |
| 7,319,992 | B2 | 1/2008 | Gaos |
| 7,386,892 | B2 * | 6/2008 | Gilfix et al. ..................... 726/28 |
| 7,539,874 | B2 * | 5/2009 | Waterland ..................... 713/183 |
| 2004/0103150 | A1 | 5/2004 | Ogdon et al. |
| 2004/0168068 | A1 * | 8/2004 | Goal et al. ..................... 713/184 |
| 2005/0044425 | A1 * | 2/2005 | Hypponen ..................... 713/202 |
| 2005/0235341 | A1 * | 10/2005 | Stieglitz et al. .................... 726/5 |
| 2007/0006301 | A1 * | 1/2007 | Nickell et al. .................. 726/22 |
| 2009/0126018 | A1 * | 5/2009 | Keohane et al. ................ 726/23 |

OTHER PUBLICATIONS

Ciaramella, Angelo; D'Arco, Paolo; De Santis, Alfredo; Galdi, Clemente; Tagliaferri, Roberto; "Neural Network Techniques for Proactive Password Checking", IEEE Transactions on Dependable and Secure Computing, vol. 3, No. 4, Oct.-Dec. 2006, pp. 327-339.*

Yampolskiy, Roman V.; "Analyzing User Password Selection Behavior for Reduction of Password Space", Proceedings of the 2006 40th Annual IEEE International Carnahan Conferences Security Technology, Oct. 2006, pp. 109-115.*

International Search Report for PCT Application No. PCT/US2008/082594, mailed Mar. 18, 2009, 3 pages.

Written Opinion for PCT Application No. PCT/US2008/082594, mailed Mar. 18, 2009, 5 pages.

Mackay, David, J.C., *Information Theory, Inference, and Learning Algorithms*, 2003, pp. 48-51; 110-111; 141-144; 162-172; 293-295; 373-374. Cambridge University Press, Cambridge, UK.

"Password Security." SecurityStats.Com, retrieved from the Internet at www.SecurityStats.com/tools/password/php on Oct. 31, 2008.

Sipser, M., *Introduction to the Theory of Computation*, 1997, pp. 31-47, PWS Publishing Company, Boston, MA.

Spataro, T., "Markov Chains, Bayesian Inference and Natural Language," Nov. 10, 2007, retrieved from the Internet at www.xeger.net/news/2007/11/10/markov-claims-bayesian-inference-and-natural-language on Oct. 31, 2008.

* cited by examiner

SYSTEMS AND METHODS FOR EVALUATING A SEQUENCE OF CHARACTERS

TECHNICAL FIELD

In various embodiments, the invention relates to systems and methods for evaluating a sequence of characters, such as systems and methods for evaluating password strength in real-time using statistical methods.

BACKGROUND

Strong passwords are typically an important part of computer system security. A password that is based on a natural language word or on a person's given name may be easy for an unauthorized user to guess and the unauthorized user may thereby gain access to confidential information protected by the password. One way to encourage users to generate strong passwords is to provide visual feedback representing the relative strength of a candidate password, such as a progress bar indicator that increases with password strength.

Some existing methods of password strength measurement analyze candidate passwords by searching through a dictionary of existing words to find matches. This approach has several drawbacks. If, for example, the dictionary is stored on a local device, such as a personal digital assistant or a cellular phone, and a search is performed thereon, the dictionary and search may be resource-intensive in terms of storage space, time, and computing power, and may consume a significant portion of the resources available on the local device. In addition, the results of the search are typically only as good as the searched dictionary, which may be incomplete or outdated. If, instead, the candidate password is generated locally but sent over a network to be evaluated remotely, the user must typically ensure that the network as well as the evaluation program itself may be trusted to keep the password secure.

Accordingly, improved systems and methods of password strength measurement are needed.

SUMMARY OF THE INVENTION

Described herein are embodiments of computer systems and methods that overcome the above-described issues by using a natural language model and a statistical algorithm to calculate the probability that a candidate password is or contains a natural language word. In one embodiment, the model consumes less storage space than a typical dictionary and the statistical algorithm requires fewer computational resources than a typical dictionary search. As such, the approaches described herein are well-suited for devices or programs that are resource constrained. In one embodiment, a statistical model of the natural language is first created to represent the likelihood that given characters in the language follow certain character sequences. A device may then store this model and use it to analyze the characters in a candidate password to determine the probability that the characters follow likely character sequences. The device is thus able to determine the probability that the candidate password is a natural language word.

Accordingly, in a first aspect, embodiments of the invention feature a method of evaluating a sequence of characters to determine the presence of a natural language word in the sequence. In accordance with the method, a subsequence of alphabetical characters is found in the sequence of characters, and, using a statistical model of a natural language, a probability that the subsequence is a natural language word is calculated. It is then determined, based on the probability, whether the subsequence is a natural language word. This method may be iteratively performed on each subsequence of alphabetical characters in the sequence of characters.

In various embodiments, the natural language is English. The natural language word may be selected from a specialized lexicon. The sequence of characters may be provided by a user and the determination of whether the subsequence is a natural language word may be performed in real-time after each character is input. In addition, finding a subsequence of alphabetical characters in the sequence of characters may include searching the sequence of characters for a subsequence of alphabetic characters occurring between non-alphabetic characters.

The statistical model may be a Markov model that models the orthography of the natural language. The Markov model may also record the probability that a particular character follows a given sequence of characters. The probability that the subsequence is a natural language word may be calculated using Bayesian inference.

The method may further include evaluating the strength of a password created from the sequence of characters. A Boolean answer and/or a numerical representation reflecting the strength of the password may then be output (e.g., displayed) to a user.

In general, in a second aspect, embodiments of the invention feature a system for evaluating a sequence of characters to determine the presence of a natural language word in the sequence. The system includes a data store containing a statistical model of a natural language, and a search module for finding a subsequence of alphabetical characters in the sequence of characters. The system may further include a computation model, in communication with the data store and the search module, for calculating a probability, based on the statistical model, that the subsequence of alphabetical characters is a natural language word. In addition, the system may include an evaluation module, in communication with the computation module, for determining if the subsequence is a natural language word based on the probability.

In various embodiments, the system executes in a self-contained computing environment, and includes an input for receiving the sequence of characters. The system may be a device with either (or both) resource-constrained memory capacity or resource-constrained processing power, such as a cell phone, a personal digital assistant, a portable music player, or a web browser.

The statistical model may be a Markov model that models the orthography of the natural language. The Markov model may also record the probability that a particular character follows a given sequence of characters. The probability that the subsequence of alphabetical characters is a natural language word may be calculated using Bayesian inference. The sequence of characters may be, for example, a potential password.

These and other objects, along with advantages and features of embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DESCRIPTION

Described herein are various embodiments of methods and systems for evaluating a sequence of characters, for example as part of a real-time probabilistic password strength measurement. In one embodiment, words in a natural language are analyzed with a statistical model such as, for example, a Markov model. The natural language may be any modern or historical language; in one embodiment, the natural language is English. The statistical model may be used to evaluate alphabetic substrings of a candidate password using, for example, Bayesian inference. In such a fashion, the probability that the substrings are words in the natural language may be determined.

Figure 1:
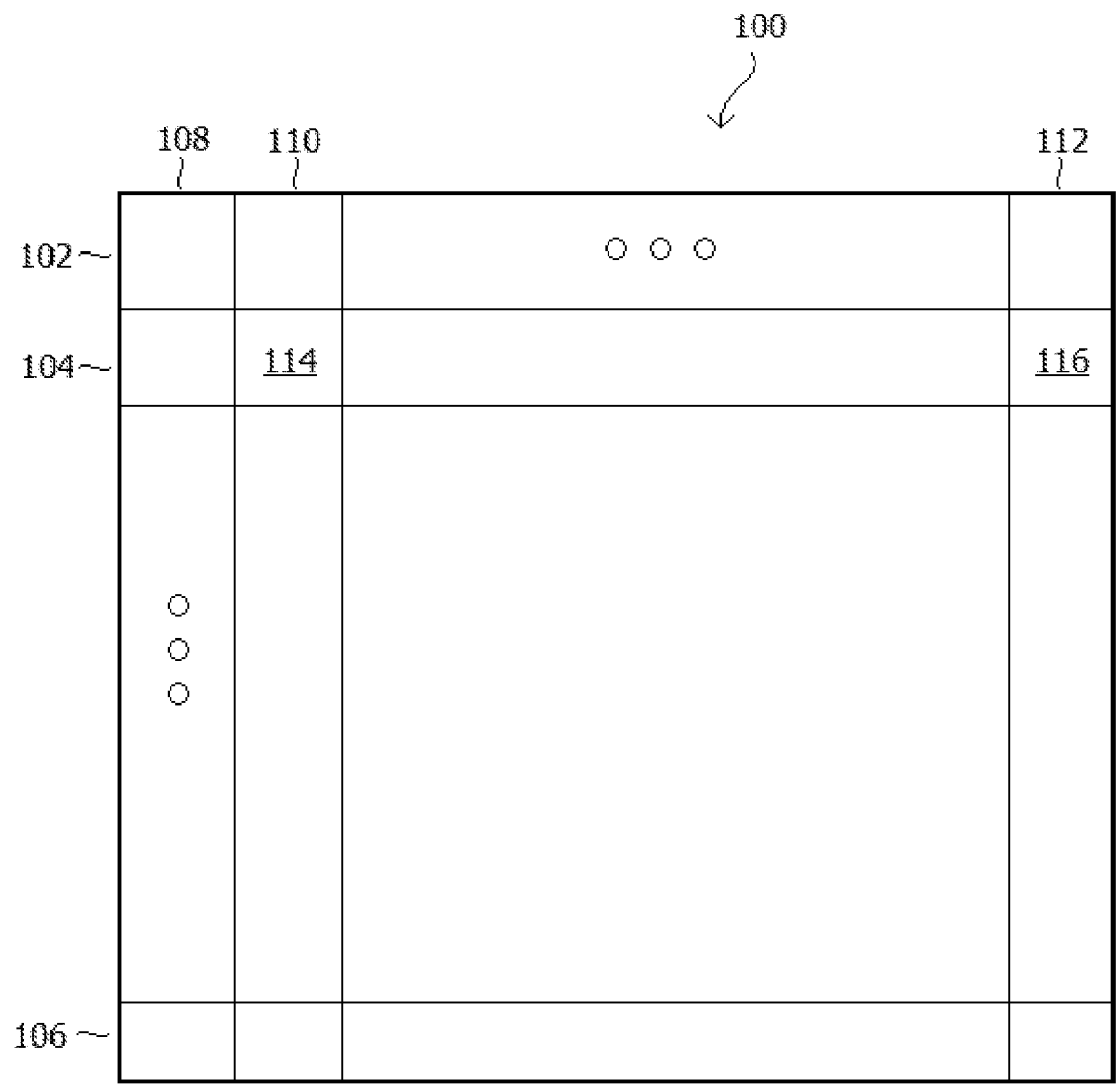
FIG. 1 depicts an associative array capable of storing a statistical model of a natural language in accordance with an embodiment of the invention.

FIG. 1 depicts one embodiment of a Markov model of a natural language. As will be readily understood by one skilled in the art, a Markov chain is a discrete-time stochastic process where the next state of the process depends solely on the present state and the present input, and does not depend directly on previous states of the process. A Markov chain of order m is a specific kind of Markov chain, in which each state is a composition of m previous inputs. In the Markov chain of order m, the next state still depends solely on the present state (which is a composition of m previous inputs) and the present input. A general overview of Markov models and Markov chains is given in, for example, Introduction to the Theory of Computation by Michael Sipser, p. 33 (PWS Publishing, 1997) and Information Theory, Inference and Learning Algorithms by David MacKay, p. 111 (University Press, 2003), the contents of which are hereby incorporated herein by reference in their entirety.

The orthography (i.e., spelling rules) of a natural language may be modeled as a Markov chain of small order. In FIG. 1, such a model is represented as a two-dimensional associative array 100. Characters in the natural language are represented by entries 102, 104, 106 on the left-hand side of the array 100, and character sequences in the natural language, i.e., Markov chains, are represented by entries 108, 110, 112 across the top of the array 100. Each row-column intersection, for example intersection 114, represents the number of times (or probability) that a character follows the character sequence in a Markov chain, for example the number of times (or probability) that the character 104 follows the character sequence 110. The contents of a column in the array 100, for example the columns 108, 110, or 112, may therefore represent the present state of a Markov chain, and the previous m characters in a character sequence are the previous m inputs. As a new character sequence is analyzed, a new column of the array 100 may be created, if necessary, and may become the next state of the Markov chain.

Data may be entered into the Markov model array 100 by analyzing a collection of words from a natural language, such as the words in a dictionary. The words to be analyzed may also come from other sources, such as lists of names typically given to persons, surnames, place names, acronyms, and/or technical or specialized lexicons. As more words are analyzed, the array 100 may more closely model the desired characteristics of the natural language. The natural language need not, however, be exhaustively analyzed to create an accurate model. In fact, in one embodiment, only a representative portion of the natural language (e.g., a subset of all the natural language's words) is analyzed.

The resultant array 100 may be a model of the relative frequency that a given character follows a given character sequence of the natural language. For example, the character "a" follows the character sequence "tr" in many English words, such as "train", "stray", or "nitrate", but follows the character sequence "ct" less frequently. A row 104 in array 100 may represent the character "a", a column 110 may represent the character sequence "tr", and a column 112 may represent the character sequence "ct". In this example, an entry 114 may represent a higher frequency of occurrence of the characters "tra" than an entry 116 representing the frequency of occurrence of the characters "cta".

Figure 2:
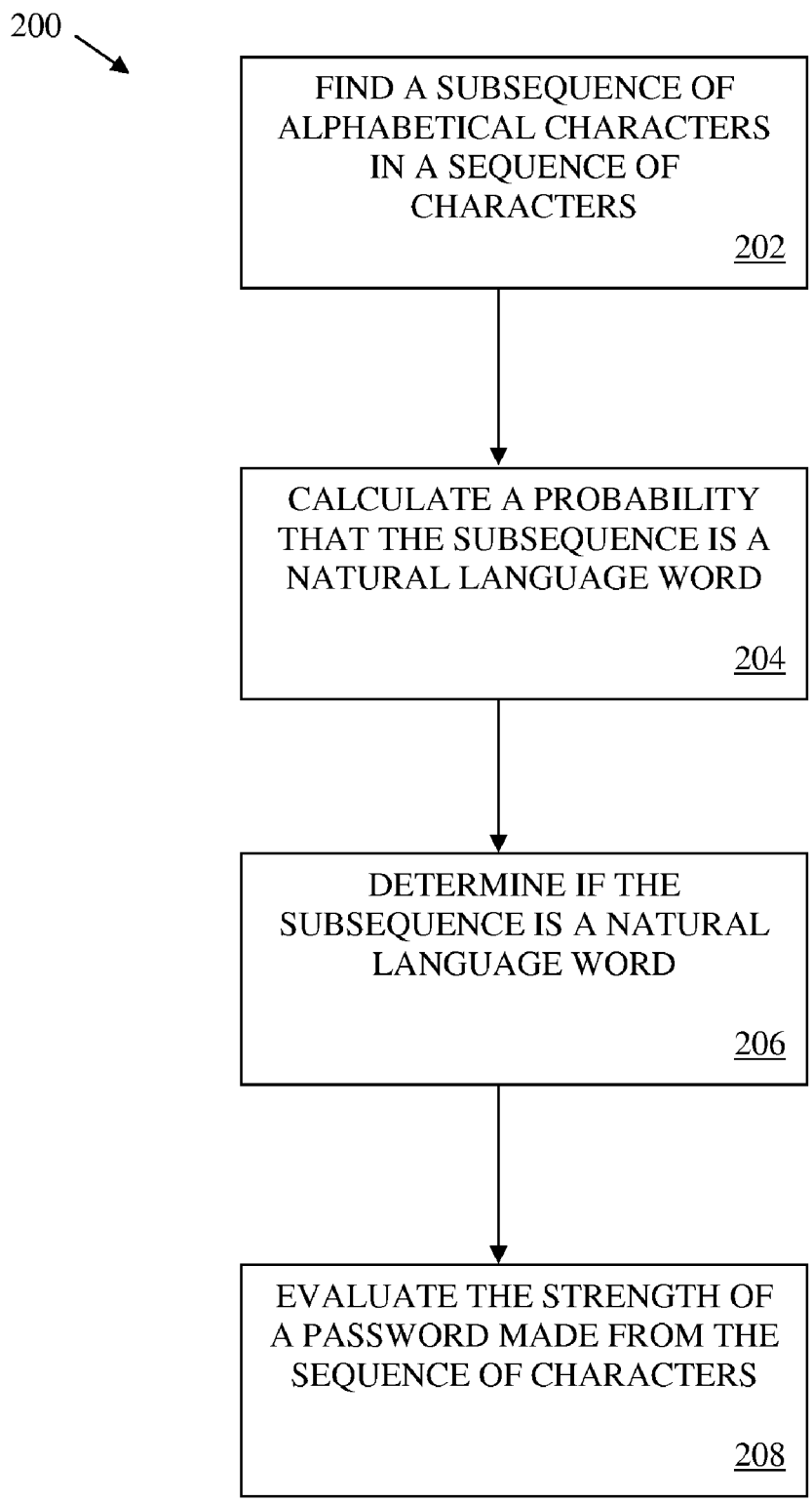
FIG. 2 depicts a flow chart of an illustrative embodiment of a method for evaluating a sequence of characters.

With reference to FIG. 2, in one embodiment, the Markov model of the natural language may be used in an exemplary method 200 to measure the likelihood that a subsequence in a given sequence of characters is a natural language word. Referring to step 202 of the method 200, the sequence of characters may first be analyzed to find a subsequence of alphabetic characters. In step 204, a statistical model may then be used to calculate a probability that the subsequence is a natural language word. In step 206, the process determines if the subsequence of alphabetic characters is a natural language word based on the probability. Where step 202 finds more than one alphabetic subsequence in a sequence of characters, steps 204 and 206 may be iteratively performed for each such alphabetic subsequence. Finally, in step 208, the process evaluates the strength of a password made from the sequence of characters.

In greater detail, at step 202 the sequence of characters may be divided into subsequences of alphabetic characters. In one embodiment, the sequence of characters contains only alphabetic characters, in which case it may be divided into a single subsequence that may have the same size and contents as the original sequence. In other cases, though, the sequence of characters may contain non-alphabetic characters such as numbers, punctuation, or spaces. In these cases, the subsequences of alphabetic characters occurring between the non-alphabetic characters may each be analyzed in turn.

With reference now to step 204, a statistical technique such as Bayesian inference may be used to determine the probability that a subsequence of alphabetic characters identified in step 202 is a natural language word. Bayesian inference may use Bayes' theorem and derived statistical information to evaluate a hypothesis in light of new data. More particularly, as will be readily understood by one skilled in the art, Bayesian inference is a statistical technique in which a user seeks to prove a hypothesis using evidence gathered from the environment and derived probabilistic information about that evidence. For every new input, the user applies Bayes' theorem to re-estimate the probability of the hypothesis being true. The probability is re-estimated using the immediately previously estimated probability, the new input, and the derived probabilistic information relating to that new input. An overview of Bayesian inference is given in, for example, Information Theory, Inference and Learning Algorithms by David MacKay, pp. 48-50, 293 (University Press, 2003), the content of which is hereby incorporated herein by reference in its entirety.

In one embodiment of step 204, the Markov model 100 of the natural language, as described above, is used as the derived statistical information for the Bayesian inference. As the subsequence of alphabetic characters is parsed, each new character (i.e., each new input) analyzed may adjust the probability that the previously analyzed portion of the subsequence is a natural language word, in accordance with the data contained in the Markov model 100. The result of parsing the entire subsequence may be a final probability that the entire subsequence is a natural language word. Thus, referring to the example above, a subsequence of characters that contains the letters "tra" may have a greater probability of being a natural language word than a subsequence of characters that contains the letters "cta".

In accordance with step 204 of the method 200, a subsequence of characters may be assigned a high probability that it is a natural language word even though the subsequence did not appear in the dictionary or other source of words initially used to create the Markov model 100 of the natural language. Such a subsequence of characters may appear word-like even though it does not include an actual natural language word because, as described above, the derived statistical information is used to analyze the probability that a given character follows a sequence of characters and the subsequence may contain high-probability combinations of characters and yet not form an actual natural language word.

Advantageously, if a new word recently added to the natural language did not appear in the originally analyzed group of words used to construct the Markov model 100 (e.g., if the words used to construct the Markov model 100 were from an out-of-date dictionary), the probability calculation at step 204 of the method 200 may still be able to analyze the new word and correctly conclude that it is a member of the natural language. Conversely, the probability calculation may also analyze a subsequence of characters that is not a natural language word and yet conclude that there is a high probability that it is, if the subsequence is sufficiently word-like.

At step 206 of the method 200, it may be determined whether the subsequence of alphabetic characters is a natural language word. Step 206 may simply return the calculated probability that the subsequence is a natural language word. Alternatively, step 206 may return a Boolean "yes" or "no." The Boolean answer may be based on the probability crossing a predetermined threshold of likelihood, such as 50%, 70%, 85%, or any other desired threshold. In yet another embodiment, a scalar measurement of the probability may be returned, such as a rating from one to ten or a graphical representation thereof. When implemented on a computer system, as described in greater detail below, step 206 may display to a user the returned probability, Boolean result, or scalar measurement.

Step 206 may determine that the subsequence of alphabetic characters does not resemble a natural language word when considered as a whole, but the subsequence may in fact consist of two or more natural language words. For example, the subsequence "robotcat" may not resemble a natural language word, but may if it is separated into the substrings "robot" and "cat". Accordingly, the subsequence may be searched again for such word-like substrings. In one embodiment, larger and larger initial substrings of the subsequence are analyzed until a word-like substring is found. Once a word-like substring is found, if characters remain in the subsequence, the remainder of the subsequence may be iteratively searched for further word-like substrings.

At step 208 of the method 200, the strength of a password made from the sequence of characters may be evaluated. In one embodiment, when the method 200 is implemented on a computer system, an overall measurement of the strength of the sequence as a password is evaluated and displayed to a user. The measurement of password strength may be based on, for example: i) the probability that each subsequence of the sequence is a natural language word, ii) the length of the sequence, and/or iii) the number and placement of non-alphabetic characters within the sequence. In one embodiment, a higher probability that each subsequence of the sequence is a natural language word decreases the password strength measurement, as does a shorter length of the sequence a smaller number of non-alphabetic characters within the sequence. In one embodiment, the measurement of password strength is returned in real time, updated each time a user enters a new character in the candidate password, and displayed to the user in real time. In another embodiment, the measurement of password strength is displayed after a user enters the entire candidate password. The measurement of password strength may be displayed to the user as, for example, a probability, as a Boolean result, or as a scalar measurement.

Figure 3:
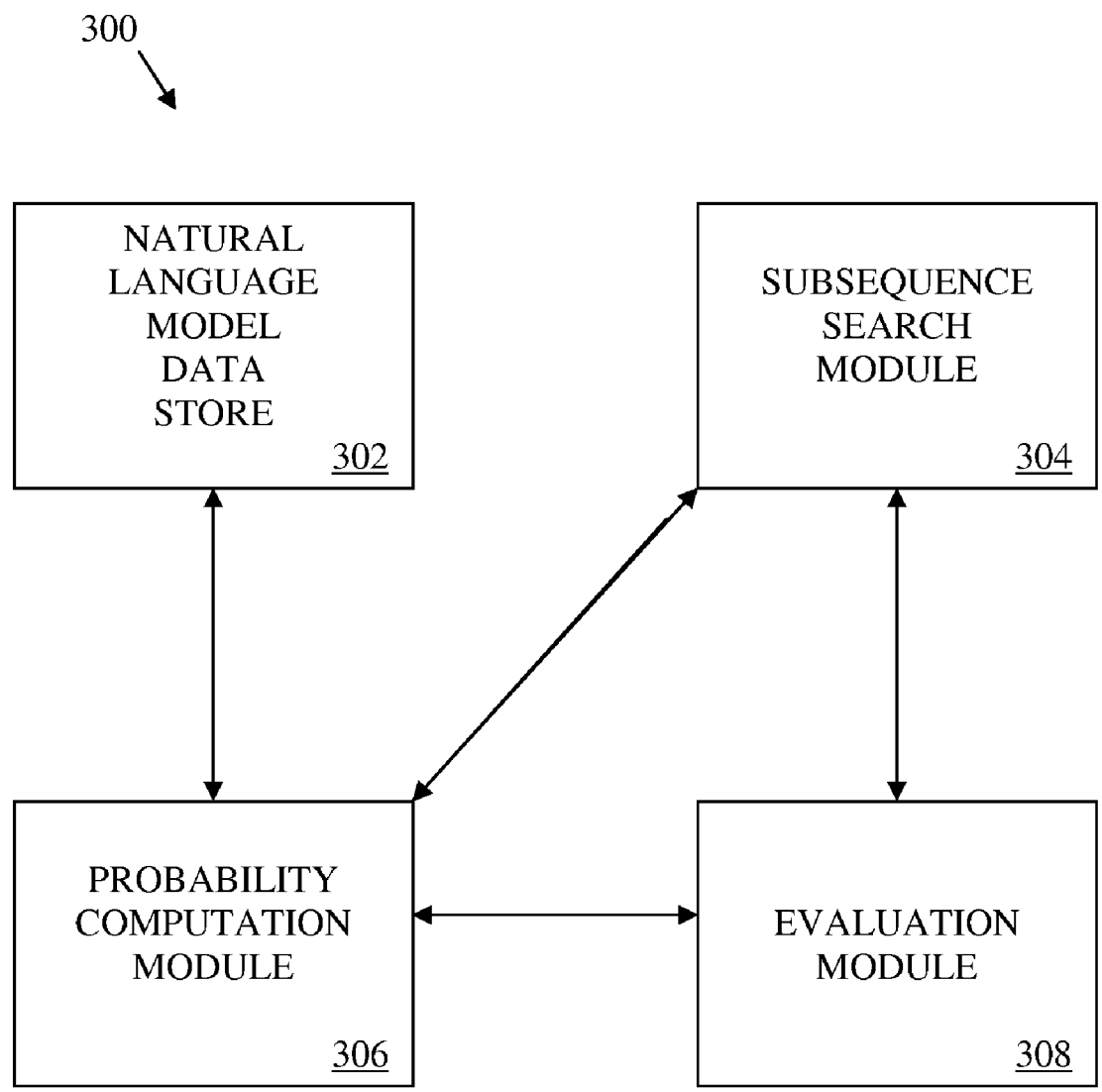
FIG. 3 depicts a block diagram of an illustrative embodiment of a system for evaluating a sequence of characters.

FIG. 3 depicts an exemplary system 300 for evaluating a sequence of characters. In one embodiment, for example, the system 300 implements a real-time probabilistic password strength measurement process. The system 300 may be any type of computing device (e.g., personal computer, Windows-based terminal, network computer, wireless device, information appliance, RISC Power PC, X-device, workstation, mini computer, main frame computer, personal digital assistant, set top box, cellular phone, handheld device, portable music player, web browser, or other computing device that is capable of both presenting information/data to, and receiving commands from, a user of the system 300). The system 300 may include, for example, a visual display device (e.g., a computer monitor), a data entry device (e.g., a keyboard), persistent and/or volatile storage (e.g., computer memory), a processor, and a mouse. In certain embodiments, the system 300 executes in a self-contained computing environment with resource-constrained memory capacity and/or resource-constrained processing power, such as, for example, in the aforementioned cellular phone, personal digital assistant, or portable music player.

In one embodiment, as illustrated, the system 300 includes a natural language model data store 302, a subsequence search module 304, a probability computation module 306, and an evaluation module 308. The natural language model data store 302 may contain a representation of characteristics of the natural language, for example the Markov model represented by the array 100. The subsequence search module 304 may locate alphabetic subsequences of characters in a sequence of alphabetic and non-alphabetic characters, as described with reference to, for example, step 202 of FIG. 2. The probability computation module 306 may access the contents of the natural language model data store 302 to determine the probability that a subsequence of alphabetic characters located by the subsequence search module 304 is a natural language word, as described with reference to, for example, step 204 of FIG. 2. For its part, the evaluation module 308 may determine, as described with reference to, for example, step 206 of FIG. 2, if the subsequence of characters is a natural language word. The evaluation module 308 may do so based on the probability returned by the computation module 306.

The natural language model data store 302, subsequence search module 304, probability computation module 306, and evaluation module 308 may each be implemented as any software program and/or hardware device, for example as an application specific integrated circuit (ASIC) or field programmable gate array (FPGA), that is capable of providing the functionality described above. In addition, it will be understood by one having ordinary skill in the art that the illustrated modules 302, 304, 306, 308 are conceptual, rather than explicit, requirements. For example, two or more of the modules 302, 304, 306, 308 may be combined into a single module, such that the functions performed by the two or more modules, as described above, are in fact performed by the single module. In addition, it will be understood that any single one of the modules 302, 304, 306, 308 may be implemented as multiple modules, such that the functions performed by any single one of the modules 302, 304, 306, 308, as described above, are in fact performed by the multiple modules.

It will be understood by those skilled in the art that FIG. 1 is a simplified illustration of the system 300 and that it is depicted as such to facilitate explanation. Moreover, the system 300 may be modified in of a variety of manners without departing from the spirit and scope of the invention. For example, the modules 302, 304, 306, 308 may all be implemented on a single computing device, or some modules may be implemented one or more other computing devices such that the modules communicate with each other over a network (not shown). As such, the depiction of the system 300 in FIG. 3 is non-limiting.

It should also be noted that embodiments of the present invention may be provided as one or more computer-readable programs embodied on or in one or more articles of manufacture. The article of manufacture may be a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

EXAMPLES

Examples of evaluating sequences of characters to determine their suitability for passwords may further illustrate embodiments of the present invention. In these examples, the natural language considered is English, and the Markov order of the statistical model is one, i.e., only one preceding character is considered. In general, however, these examples may be extended to any natural language and to a Markov chain of any order.

In a first example, a user inputs the character sequence "3&4Qard67" as a possible password. With reference to FIG. 2, a subsequence of alphabetical characters "Qard" is then identified at step 202. Next, using a statistical model, each character is considered in turn at step 204, and a likelihood that the character follows the preceding character is identified. Because the first letter "q" begins many common English words, the initial probability that the subsequence "Qard" is an English word is high. Because, however, it is extremely unlikely that anything other than a "u" follows a "q" in English, as reflected in the statistical model, the fact that the next letter "a" follows the "q" lowers the overall probability that "Qard" is an English word. The remaining letters "r" and "d" are somewhat likely to follow their preceding characters "a" and "r", respectively, and so the overall probability that "Qard" is an English word is somewhat increased based on the statistical model. However, those increases in likelihood are not enough to overcome the very low likelihood of an "a" following a "q". As a result, the overall probability calculated at step 204 of the subsequence "Qard" being an English word is relatively low. At step 206, the calculated probability is compared to a threshold probability and found to be below that threshold probability. As a result, the subsequence "Qard" is determined not to be an English word. In addition, at step 208, the length of the character sequence "3&4Qard67" and the ratio of alphabetic characters to non-alphabetic characters is considered. The character sequence is determined to be of medium length and the ratio of alphabetic characters to non-alphabetic characters is determined to be greater than 1. A result is thus displayed to the user that the character sequence "3&4Qard67" is a medium-to-high strength password.

In a second example, a user inputs the character sequence "#6ray-gan45" as a possible password. In this example, there are two subsequences of alphabetic characters, "ray" and "gan", found at step 202 and each is considered in turn. Referring to the first subsequence "ray", the step 204 of the method 200 may find, based on the statistical model, that an "a" is likely to follow an "r" and that a "y" is likely to follow an "a", and, therefore, that "ray" has a high probability of being an English word. That probability may be higher than a set threshold and, as such, the subsequence "ray" may be determined to be an English word at step 206. Turning to the second subsequence, "gan", the step 204 of the method 200 may find, again based on the statistical model, that there is a moderate probability that an "a" follows a "g" and that an "n" follows an "a", and, thus, that the subsequence "gan" has a moderate probability of being an English word. In one embodiment, the threshold for determining, at step 206, if a subsequence is a natural language word is set high enough such that the subsequence "gan" is not found to be an English word. Alternatively, in another embodiment with a lower threshold, because the subsequence "gan" is sufficiently word-like, it is determined at step 206 to be an English word and is flagged as a potentially weak part of the password. In either case, as previously described, the two subsequences "ray" and "gan" are considered at step 208 in the context of the larger character sequence, which contains non-alphabetic characters as well. A result, for example that the character sequence "#6ray-gan45" is a low-to-medium strength password, is then displayed to the user.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of evaluating a sequence of characters received by one or more computing devices to determine the presence of a natural language word in the received sequence, the method comprising:

finding a subsequence of alphabetical characters in the received sequence of characters, wherein the received sequence comprises both alphabetical and non-alphabetic characters, and wherein the subsequence corresponds to alphabetical characters occurring between the non-alphabetical characters in the received sequence;

calculating a probability that the subsequence is a natural language word using a statistical model of a natural language; and determining if the subsequence is a natural language word based on the probability;

wherein the finding, calculating, and determining steps are performed on the one or more computing devices.

2. The method of claim 1, wherein the natural language is English.

3. The method of claim 1, wherein the statistical model is a Markov model.

4. The method of claim 3, wherein the Markov model models the orthography of the natural language.

5. The method of claim 3, wherein the Markov model records the probability that a particular character follows a given sequence of characters.

6. The method of claim 1, wherein calculating the probability comprises using Bayesian inference.

7. The method of claim 1, wherein the sequence of characters is a password.

8. The method of claim 7 further comprising evaluating the strength of the password based on whether the subsequence is determined to be a natural language word.

9. The method of claim 8 further comprising outputting a Boolean answer reflecting the strength of the password.

10. The method of claim 8 further comprising outputting a numerical representation reflecting the strength of the password.

11. The method of claim 1, wherein finding a subsequence comprises searching the sequence of characters for a subsequence of alphabetic characters occurring between the non-alphabetic characters.

12. The method of claim 1 further comprising iteratively performing the method of claim 1 for a plurality of subsequences in the sequence of characters.

13. The method of claim 1, wherein the sequence of characters is provided by a user and determining if the subsequence is a natural language word is performed in real-time after each character is input.

14. The method of claim 1, wherein the natural language word is selected from a specialized lexicon.

15. A system for evaluating a sequence of characters to determine the presence of a natural language word in the sequence, the system comprising:
one or more processors; and
a memory comprising:
instructions which, when executed by the one or more processors, cause the one or more processors to implement a method, the method comprising:
finding a subsequence of alphabetical characters in the sequence of characters, wherein the received sequence comprises both alphabetical and non-alphabetic characters, and wherein the subsequence corresponds to alphabetical characters occurring between the non-alphabetic characters in the received sequence;
calculating a probability, based on the statistical model, that the subsequence of alphabetical characters is a natural language word; and
determining if the subsequence is a natural language word based on the probability.

16. The system of claim 15, wherein the system executes in a self-contained computing environment.

17. The system of claim 15 further comprising an input for receiving the sequence of characters.

18. The system of claim 15, wherein the system is a device with resource-constrained memory capacity.

19. The system of claim 15, wherein the system is a device with resource-constrained processing power.

20. The system of claim 15, wherein the system is selected from a group comprising a cell phone, a personal digital assistant, a portable music player, and a web browser.

21. The system of claim 15, wherein the statistical model is a Markov model.

22. The system of claim 21, wherein the Markov model models the orthography of the natural language.

23. The system of claim 21, wherein the Markov model records the probability that a particular character follows a given sequence of characters.

24. The system of claim 15, wherein the computation module employs a Bayesian inference in calculating the probability.

25. The system of claim 15, wherein the sequence of characters is a potential password.

* * * * *